United States Patent [19]
Peniston et al.

[11] 3,862,122

[45] Jan. 21, 1975

[54] METHOD OF RECOVERING CHITOSAN AND OTHER BY-PRODUCTS FROM SHELLFISH WASTE AND THE LIKE

[76] Inventors: Quintin P. Peniston, Rt. 7, Box 7710, Bainbridge Island, Wash. 98110; Edwin Lee Johnson, Rt. 5, Box 4246, Issaquah, Wash. 98027

[22] Filed: Feb. 16, 1972

[21] Appl. No.: 226,661

[52] U.S. Cl........... 260/211 R, 260/112 R, 423/421
[51] Int. Cl............................................. C07c 95/04
[58] Field of Search..... 260/211 R, 112 R; 423/421, 423/422, 423

[56] References Cited
UNITED STATES PATENTS

| | | | |
|---|---|---|---|
| 2,040,879 | 5/1936 | Rigby | 260/211 R |
| 2,842,049 | 7/1958 | Delangre | 260/211 R |
| 3,014,026 | 12/1961 | Kroll et al. | 260/211 R |
| 3,533,940 | 10/1970 | Peniston et al. | 260/211 R |

*Primary Examiner*—Johnnie R. Brown
*Attorney, Agent, or Firm*—Rines & Rines; Shapiro and Shapiro

[57] ABSTRACT

This disclosure deals particularly with recovering chitosan and/or protein and other by-products from shellfish waste and the like with the aid of an alkali process, including the removal of calcium and the like from the waste by producing calcium-saccharate and subjecting the same to a subsequent carbonation step.

7 Claims, 1 Drawing Figure

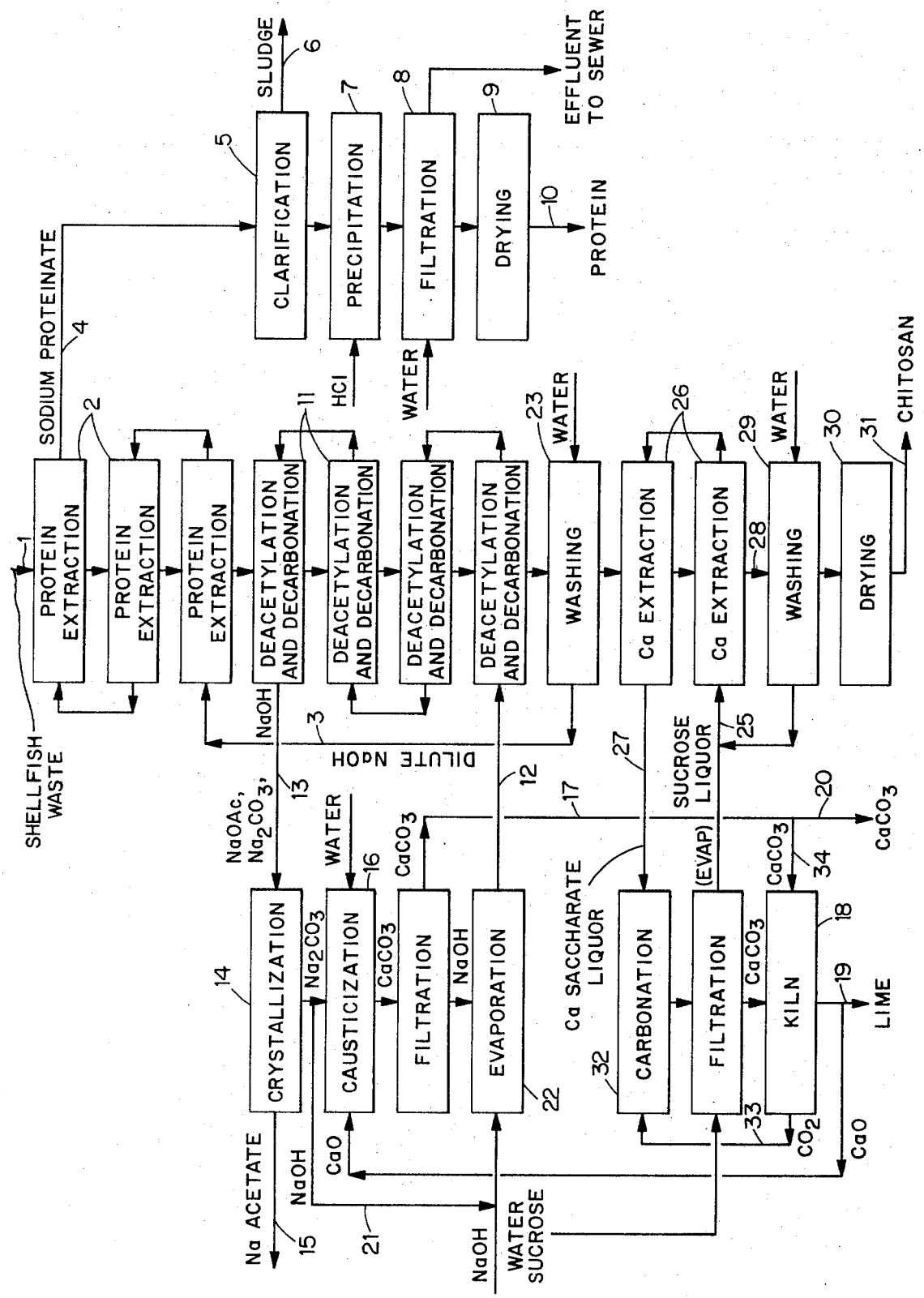

METHOD OF RECOVERING CHITOSAN AND OTHER BY-PRODUCTS FROM SHELLFISH WASTE AND THE LIKE

The present invention relates to methods of recovering chitosan, protein, and other by-products from shellfish waste and the like.

Chitosan is a polymeric carbohydrate material obtained from chitin, the structural material of crustacea shells, by a process of deacetylation. The naturally occurring chitin is a linear polymer of 2-deoxy-2-acetyl amino glucose in which the glycosidic link between primary units is 1–4, $\beta$ as in cellulose. It has a degree of polymerization of 2,000 to 3,000 primary units. While chitin is insoluble in almost all substances except strong mineral acids, chitosan is soluble in dilute organic acids and many uses have been developed for it. These include formation of films and fibers, thickening agents, coatings, gels, and recently a cationic polyelectrolyte coagulant and coagulant aid for water and waste treatment.

Chitosan is usually prepared from shellfish waste by dissolving mineral matter (calcium carbonate) with hydrochloric acid and removing protein by extraction with dilute alkali solutions. The resulting chitin is then deacetylated by treatment with strong alkali solutions to yield chitosan.

Unfortunately, the cost of this chemical process and the isolation of the chitosan, including the lack of availability at reasonable cost of hydrochloric acid in areas where shellfish waste is abundant, has prohibited such processes from becoming commercially attractive and has greatly restricted the utilization of chitosan.

Further efforts at improving this process and finding commercial uses for chitosan of the quality resulting from the use of such processes are described in our prior U.S. Pat. application Ser. No. 829,154, filed May 6, 1969, entitled "Process for Recovery of By-Products from Shellfish Waste" and U.S. Pat. No. 3,533,940, issued Oct. 13, 1970 and entitled "Method for Treating an Aqueous Medium with Chitosan and Derivatives of Chitin to Remove an Impurity."

Again, such processes are limited by the requirement for low-cost hydrochloric acid and the plaguing calcium chloride brine that results from the demineralization steps involved.

While such applications for chitosan are of considerable commercial interest and have been found to work admirably well in practice, the inherent cost of production has still made difficult the degree of wide-spread use of chitosan that its properties and characteristics would ordinarily justify.

An object of the present invention, accordingly, is to provide a new and improved process that represents an entirely different approach to the manufacture of chitosan and which eliminates the need for hydrochloric acid to demineralize the shell, while recycling most of the processed chemicals and dispensing with the intermediate isolation of chitin inherent in prior processes. The novel method underlying the invention, in summary, further permits recovery of protein, sodium acetate and lime or calcium carbonate as by-products, providing nearly complete conversion of shellfish waste into marketable commodities.

A further object of the invention is to provide a new and improved process for producing chitosan.

Still another object is to provide a more generic process for removing alkaline earth carbonates, such as calcium carbonate, from materials containing the same, such as crustacean shell or other sources of the same.

Still another object is to provide a new and improved method of recovering protein and other useful by-products from shellfish waste and the like.

Other and further objects will be explained hereinafter and are more particularly delineated in the appended claims.

The invention will now be described with reference to the accompanying drawing, the single FIGURE of which is a flow diagram illustrating a preferred form of the process underlying the invention.

Referring to the drawing, shellfish waste or other source of materials here involved is shown applied at 1 to an extraction apparatus 2 labelled "protein extraction" and interconnected in countercurrent relationship. The shellfish waste, such as the shells of crab, shrimp, lobster, prawns, krill, crayfish and other species, is coursely ground preferably to the particulate size of ⅛ to ¼ of an inch, before being charged at 1 to the extraction apparatus 2 in which the shell is moved countercurrently to the flow of dilute sodium hydroxide extractant, shown applied at 3, and obtained from a later step of the process as hereinafter explained. The dilute hydroxide solution may be of the order of 0.5 to 2 percent, more or less, and it may contain sodium sulphite or other reducing agents to minimize damage to the protein during the extraction. The amount of extraction alkali solution applied at 3 is controlled to maintain a residual of free caustic alkalinity needed to form proteinate, shown extracted at 4. The time of the extraction step can extend from 1 to about 4 hours depending upon the porosity of the shell and the temperature, which is preferable in the range of about 50° to 70° C.

The sodium proteinate solution at 4 is then clarified by centrifugation or filtration at 5, and may also be treated with refining agents to remove lipids or pigments shown ejected as sludge at 6. The clarified product is then neutralized with the aid of added hydrochloric acid to the pH of minimum solubility, which will be in the range of from about 4.5 to 3.4, depending upon the shellfish species and the extraction conditions. The resulting precipitated protein at 7 is collected by filtration or centrifugation at 8 and is washed and dried as at 9, preferably by reslurrying and spray-drying to provide the protein by-product at 10.

Following protein removal, the shell is again extracted countercurrently in a further series of extraction cells 11 labelled "Deacetylation and Decarbonation". Strong sodium hydroxide is shown applied at 12 to the extractant cells 11, preferably 30 to 50 percent alkali solution at 120° to 150° C, simultaneously deacetylating the chitin and converting the calcium carbonate to calcium hydroxide "in situ" according to the equilibrium equation of $Na_2CO_3 + Ca(OH)_2 \rightleftarrows CaCO_3 + 2NaOH$.

While this equilibrium is well known in the technology of caustic soda manufacture, it has been operated substantially in the forward direction only to obtain increased yields of caustic soda (F. E. Littman and H. J. Gaspari, Industrial and Engineering Chemistry 48:408 [1956]). No practical application or substantial use for the reverse operation has apparently heretofore been found.

The prior art has thus driven the equilibrium to the right; whereas, in accordance with the present invention, the high temperature is employed to increase the rate of reaction and to drive the equilibrium to the left by the high caustic soda concentration. The effluent solution from this operation, shown at 13, contains excess sodium hydroxide, sodium acetate, and sodium carbonate, and is passed to a crystallizer 14 to precipitate sodium acetate as a useful by-product at 15, the same being removed by filtration or centrifugation, washed and purified by conventional means. Most of the sodium carbonate is also precipitated at this stage.

The mother liquor is diluted with water and treated with lime at 16 in order to convert the remaining sodium carbonate back to sodium hydroxide. Sodium carbonate recovered from the crystalline sodium acetate-sodium carbonate mixture is also lime treated for NaOH recovery. The precipitated calcium carbonate is collected as at 17, washed and passed to the lime kiln 18 for conversion to lime at 19. Excess over that needed for recycling in the process is available as lime at 19 or calcium carbonate at 20.

The regenerated sodium hydroxide solution resulting at 21 is combined with added strong alkali to replace that removed at 15 as sodium acetate, and is evaporated at 22 to the desired strength for application at 12 to the extracting process.

Following deacetylation and decarbonation, the residual shell, now consisting of chitosan and calcium hydroxide, is washed at 23 with carbonate-free water to remove residual sodium hydroxide. This washing is the source of the dilute sodium hydroxide initially used at 3 for the protein extraction.

The chitosan-calcium hydroxide mixture is now extracted, in accordance with the present invention, with an aqueous sucrose solution applied at 25 to further extraction cells 26, labelled "calcium extraction," again in a countercurrent manner. The calcium hydroxide becomes dissolved as calcium saccharate, withdrawn at 27, leaving an output at 28 of substantially pure chitosan that may be washed to neutrality at 29, dried at 30, and made available at 31.

While the drawing shows several cells or steps for the protein extraction, the deacetylation and decarbonation and the calcium hydroxide extraction, it is understood that any suitable countercurrent treatment apparatus may be used for any of the three operations. Thus batteries of diffusion cells like the Robert cells used for beet sugar extraction might be used or continuous countercurent devices moving both liquid and solid phases in opposite directions might alternatively be employed.

The calcium saccharate solution at 27 contains 5 to 10 percent sucrose and a calcium content up to about two mols of calcium per mol of sucrose and, in accordance with the invention, in preferred form, it is treated with carbon dioxide at 32, obtained at 33 from the lime kiln 18 or boiler stack gas, as is well known particularly in the beet sugar industry.

The saccharate becomes decomposed by this carbonation and precipitates calcium carbonate at 34 which is washed and passed to the lime kiln 18. The sucrose solution is evaporated to the desired concentration and reused at 25 in the process.

While sucrose has been described as preferred, other substances capable of effectively "chelating" calcium, such as the various glycols, E D TA, sorbital or gluconates may also be used for similar purposes.

It is in order to describe, by way of several examples, how the above process has been operated and may be operated with various modifications to produce the by-products of the invention; though it is to be understood that certain sub-sets of steps of the overall-process may be used in and of themselves for useful purposes where all of the features of the process may not be simultaneously desired.

Example 1 – Simultaneous Deacetylation and Decarbonation of Deproteinized Dungeness Crab Shell Dungeness Crab Shell, ground to 8 to 30 mesh and previously deproteinized by repeated extraction with dilute sodium hydroxide has the following analysis:

$CaCO_3$ (dry basis) — 65 percent

Chitin (dry basis) — 35 percent

A glass tube 14 mm in diameter by 14½ inches, packed length, was filled with 28.5 grams of the above deproteinized shell. It was contained by glass wool plugs at top and bottom and rubber stoppers carrying thermometers to measure inlet and outlet temperatures. The tube was wrapped with a 100 ohm, glass covered, heating tape controlled by a variable transformer. Sodium hydroxide solution, 40 percent by weight (572.0 grams NaOH per liter at 20° C) was contained in a two liter round bottom Pyrex flask fitted with a siphon tube and a vent tube for pressure release. It was heated with a glass covered mantle also controlled by a variable transformer. The flask was elevated relative to the packed tube to permit gravity flow of the sodium hydroxide solution through the tube.

The sodium hydroxide solution was heated to its boiling point (128°C) and caused to flow downward through the packed tube, controlling flow by means of a screw clamp on the effluent tubulature. A log of the operation was as follows:

| Time | Inlet Temperature | Exit Temperature | ml Effluent |
| --- | --- | --- | --- |
| 10:12 | 128°C | 96°C | 0 (Start) |
| 10:20 | 128°C | 119°C | 50 |
| 10:27 | 128°C | 95°C | 100 |
| 10:34 | 128°C | 118°C | 150 |
| 10:40 | 128°C | 120°C | 200 |
| 10:48 | 128°C | 122°C | 250 |
| 11:02 | 128°C | 100°C | 300 |
| Average | 128°C | 110°C | |

The mean temperature in the tube can be estimated as midway between average inlet and exit temperatures or 119° C. The average flow rate was 300/50 = 6 ml per minute. The "average residence" time for the sodium hydroxide solution, assuming 40 percent free volume in the tube, was 3.77 minutes.

F. E. Littman and H. J. Gaspari, Industrial and Engineering Chemistry, 48:408 (1956) studied the equilibrium:

$$Na_2CO_3 + Ca(OH)_2 \rightleftarrows CaCO_3 + 2NaOH$$

at 95° C for concentrations of total equivalent sodium hydroxide up to 240 grams per liter. This would be approximately 20% NaOH by weight. They found the 240 grams per liter to be limiting due to precipitation of a double carbonate believed to be pirssonite, $CaCO_3 \cdot Na_2CO_3 \cdot 2H_2O$. With excess calcium hydroxide they found about 4 hours necessary to attain equilibrium. Higher temperatures and concentration were not studied since their interest was in the causticization of sodium carbonate solutions.

Recalculating the equilibrium data of Littman and Gaspari for the reverse reaction, it is found that the percent conversion of sodium hydroxide to sodium carbonate is approximately linear for the range studied and can be represented by the equation:

$$\text{percent conversion} = 0.1475x - 12.9$$

where $x$ represents Total Equivalent Sodium Hydroxide in grams per liter. At $x = 240$ grams per liter the conversion is 22.6 percent. If extrapolation to 572 grams NaOH per liter were allowable, the percent conversion would be 71.6 percent. This, of course, may not be attainable due to the limited solubility of sodium carbonate, the precipitation of double salts and other factors. The calculation serves, however, to illustrate that the equilibrium for conversion of calcium carbonate to calcium hydroxide is favored by higher sodium hydroxide concentration. In a countercurrent process any reasonable degree of conversion would permit carrying the reaction to completion; i.e., complete conversion of calcium carbonate to calcium hydroxide, since carbonate is removed from the reaction zone as sodium carbonate in the extraction. It is thus not necessary to operate the process at or near the equilibrium to effect carbonate removal. However, the average residence time of 3.77 minutes calculated for the experiment of this Example 1, in view of the experience of Littman and Gaspari that 4 hours was needed to attain equilibrium at 95° C, was far too short to obtain a high degree of conversion in the effluent time from the column of shell.

Returning to the description of the experiment of Example 1, the sodium hydroxide effluent from the column was collected in portions of 50 mm each.

These on cooling formed a considerable needle-like precipitate of crystals which were found to be sodium carbonate. Solubility data for sodium carbonate in aqueous solutions of sodium hydroxide is presented in "Solubilities of Inorganic and Metal Organic Compounds" by Seidel, American Chemical Society, Fourth Edition, Volume II, pp 917 to 920, 1965 (Washington, D.C.). At 20° C a 39.8 percent solution of sodium hydroxide will dissolve, 0.3 percent of sodium carbonate and the solid phase at equilibrium is sodium carbonate mono-hydrate. At higher temperatures solubilities are considerably higher. It is thus possible in the process to extract carbonate as sodium carbonate from the shell and to remove this as a solid phase on cooling the extract liquor. This avoids the necessity for dilution of the sodium hydroxide and treatment with lime to re-causticize the liquor before reuse in the process. A considerable saving in evaporation cost is thereby effected.

Sodium acetate shows solubility characteristics similar to those of sodium carbonate in strong hydroxide solutions. At 20° C a 40 percent solution of sodium hydroxide will dissolve 3.5 percent sodium acetate. (R. A. Morgan and R. D. Walker, Industrial Engineering Chemistry, 37:1186 (1945). At higher solids to liquids ratios than used in the present example, sodium acetate will also appear as a solid phase in the extract liquor. This can be removed from the sodium carbonate by fractional crystallization or alternatively the mixture can be dissolved and treated with lime to precipitate calcium carbonate. The sodium acetate can then be recrystallized from the concentrated sodium hydroxide solution.

The 28.5 grams of deproteinized shell used in this experiment would yield 19.6 grams of sodium carbonate and 4.03 grams of sodium acetate for complete decarbonation and deacetylation. It is indicated that the two reactions were only partially completed. Previous experience has shown that 40% NaOH, 50 minutes and 119° C are not sufficient to cause complete deacetylation of chitin. Generally, 50% NaOH, 2 hours and 143° C have been found adequate.

Following the extraction with strong sodium hydroxide the shell was washed in the tube by percolation of freshly boiled distilled water at 95° C. A total volume of washings amounting to 485 ml was collected over 60 minutes and this was found to contain 0.156 grams of calcium hydroxide or 1.14 percent of the original calcium carbonate in the shell. The pH of the final wash effluent was still about 12.0, indicating continuing extraction of calcium hydroxide.

A 10 percent solution of sucrose was next percolated through the column of shell at 80° to 90° C. Effluent was collected in 100 milliliter increments over a 30-minute period, a total volume of 700 milliliters being collected. The average flow rate was thus 35 milliliters per minute and the average retention time 0.65 minutes. Increments of effluent were analyzed for calcium content with results as follows:

| Increment | Milliliter | $CaCO_3$ g/100 ml |
|---|---|---|
| 1 | 100 | 0.299 |
| 2 | 100 | 0.319 |
| 3 | 100 | 0.329 |
| 4 | 100 | 0.329 |
| 5 | 100 | 0.339 |
| 6 | 100 | 0.345 |
| 7 | 100 | 0.350 |
| Summation | | 2.310 |

The total calcium extracted by the sugar solutions was thus only 12.5 percent of that originally contained in the deproteinized shell. However, the calcium concentration was still rising in the last increment and the residence time was far too short to permit diffusion of sucrose into the interstices of the shell particles or of calcium saccharate out into the percolating solution. The calcium holding capacity of a 10 percent sucrose solution, assuming formation of dicalcium saccharate is 5.85 grams as calcium carbonate per 100 milliliters. Only 6 percent of this concentration was attained in the above treatment.

Following the sucrose extraction about 3 liters of distilled water were passed through the bed of shell. The washings were found to contain 1.64 grams of calcium hydroxide amounting to 12.0 percent of the original calcium in the deproteinized shell. The pH level of the final wash liquor was still 12.0 indicating the presence of additional unextracted calcium hydroxide in the shell. Total calcium extracted in the process was as follows:

| Treatment | % of Original Calcium Removed |
|---|---|
| 40% Sodium Hydroxide | nil |
| First water wash | 1.14 |
| Sucrose Extraction | 12.5 |
| Final Water Wash | 12.0 |
| Total extracted | 25.64% |

The extracted shell was removed from the tube, collected on a filter and oven dried. It weighed 18.9 grams, indicating a loss of 34.6 percent in the treatment. The dried shell was treated with dilute hydrochloric acid to dissolve residual calcium. This amounted to 10.45 grams calculated as calcium carbonate. However, unlike chitin prepared in the usual manner, the partially deacetylated material showed a marked swelling capacity when the calcium chloride solution was removed by washing with distilled water. The material swelled to about 20 times its original volume and became a clear transparent gel. After pressing under a rubber dam it still contained about 20 times its dry weight as water. After washing and drying it amounted to 6 grams (ash free basis) or 92 percent of the original chitin in the shell. Its nitrogen content was found to be 7.91 percent. The calculated value for chitin is 6.9 percent and for acetyl-free chitosan 8.7 percent. About 56 percent deacetylation in the treatment is therefore indicated.

Example 2

The apparatus of Example 1 was again used in this experiment. The glass tube was charged with 28.2 grams of the same deproteinized Dungeness crab shell except that it was reduced in particle size and screened to 15 to 20 mesh. To remove confined air and thus minimize channeling, the tube was filled slowly from the bottom with 50 weight percent sodium hydroxide solution. The tube and contents were preheated with the heating tape and a flow of 50 percent sodium hydroxide at its boiling point (146° C) was then initiated downward through the tube. A log of the treatment follows:

| Time | Ml. Effluent Cummulation | Flow Rate ml/min | Residence Time Minutes | Sample No. | Sample ml/sample |
|---|---|---|---|---|---|
| 10:20 am | 0 | — | — | — | — |
| 10:28 am | 5.5 | 0.69 | 33 | — | — |
| 10:38 am | 9.5 | 0.4 | 56 | — | — |
| 11:02 am | 35.0 | 1.0 | 22.6 | 1 | 35 |
| 11:24 am | 125.0 | 4.1 | 5.5 | 2 | 90 |
| 11:57 am | 222.0 | 2.9 | 7.8 | 3 | 98 |

Mean temperature in the column was approximately 130° C during the extraction period and the total duration was 97 minutes. Sample 1 was yellow in color due to extraction of residual protein and on cooling formed a copious precipitate of sodium carbonate. According to equlibrium data from Seidel (loc. cit.) this was the anhydrous salt. Samples 2 and 3 were practically colorless but showed less precipitate on cooling. This, presumably, was due to the faster flow rate during collection of these samples.

The precipitates in Samples 1, 2 and 3 were collected on a tared sintered glass filter, washed with 95 percent ethanol and dried, yielding 2.11 grams of sodium carbonate equivalent to 11 percent of the carbonate in the deproteinized shell.

After the extraction with 50 percent sodium hydroxide, freshly boiled distilled water was passed downward through the column of shell collecting the effluent in four increments as follows:

| Time | ml | Sample | ml/min. |
|---|---|---|---|
| 1:40 | 0 | — | — |
| 1:45 | 85 | W-1 | 17 |
| 1:55 | 80 | W-2 | 8 |
| 2:08 | 123 | W-3 | 9.5 |
| 2:20 | 117 | W-4 | 9.8 |

Total duration of the washing treatment was 40 minutes and the mean temperature was 83° C.

On cooling Sample W-1 deposited a large amount of crystals, probably of sodium carbonate decahydrate. Seidel (loc. cit). Sample W-2 did not show a precipitate and Samples W-3 and W-4 showed small precipitates of calcium hydroxide. The crystals from Sample W-1 were collected, washed with alcohol, dried and weighed yielding 19.7 grams of sodium carbonate decahydrate equivalent to 37.5 percent of the original carbonate. It should be noted that the shell was allowed to stand in contact with 50 percent sodium hydroxide solution for 100 minutes prior to start of the washing treatment. Apparently equilibrium in the conversion of calcium carbonate to calcium hydroxide was more closely approached than during the flow period for the strong alkali solution.

The filtrates from Sample W-1 and Samples W-2, 3 and 4 were analyzed for their sodium hydroxide, sodium carbonate and calcium contents with results as follows:

| Sample | NaOH g/100 ml | Na$_2$CO$_3$ g/100 ml | CaCO$_3$ g/100 ml |
|---|---|---|---|
| W-1 filtrate | — | nil | nil |
| W-2 | 35 | 2.02 | nil |
| W-3 | — | nil | nil |
| W-4 | — | nil | 0.222 |

Total carbonate removed in the extraction and washing treatments is thus found to be 57 percent of that originally present. Calcium removal in the strong alkali extraction can be assumed negligible since calcium hydroxide is quite insoluble in sodium hydroxide solutions. Calcium removal in the washing treatment was 1.2 percent of that in the deproteinized shell.

Following the water wash, the column of shell was extracted with 10 percent solution at a mean temperature of about 80° C. A log for this operation follows:

| Time | ml | ml/min | Sample | CaCO₃ g/100 ml | CaCO₃ g/sample |
|------|-----|--------|--------|----------------|----------------|
| 2:47 | 0   | —      | —      | —              | —              |
| 2:51 | 107 | 28     | S-1    | .284           | 0.304          |
| 2:57 | 108 | 18     | S-1    | .394           | 0.427          |
| 3:05 | 103 | 13     | S-3    | .434           | 0.448          |
| 3:15 | 120 | 12     | S-4    | .386           | 0.340          |
| 3:30 | 88  | 5:8    | S-5    | .414           | 0.365          |
| 4:00 | 112 | 3.7    | S-6    | .496           | 0.560          |
|      |     |        |        |                | 2.444          |

The effect of the reduced flow rate on the calcium hydroxide extraction is apparent. Total calcium extracted calculated as carbonate was 13 percent of that originally present in the deproteinized shell.

Following the sucrose extraction the column of shell was allowed to stand flooded with sucrose solution for 64 hours. It was then washed with distilled water. Washings were collected in three fractions, the first being mainly the sucrose solution which had been 64 hours in contact with the shell. Volumes and calcium contents of these fractions were as follows:

| Sample | Volume | CaCO₃ g/100 ml | CaCO₃ total |
|--------|--------|----------------|-------------|
| F-1    | 120    | .974           | 1.17        |
| F-2    | 138    | .274           | 0.38        |
| F-3    | 200    | .222           | 0.44        |

Total calcium extracted in sugar and washings was 25 percent of that originally contained.

Example 3

100 grams coarse (¼ to ⅛ inch) deproteinized Dungeness crab waste was heated in a neoprene lined stainless steel autoclave with 400 grams of 40 weight percent sodium hydroxide solution. The temperature was held at 140° C for 2 hours. It was then allowed to cool and remain in the closed autoclave overnight.

The mixture was reheated to 100° C, filtered on a Buchner funnel and washed exhaustively with freshly boiled distilled water. The drained weight of the washed shell was 170 grams. It was almost completely soluble in dilute acetic acid indicating substantially complete deacetylation. Aliquots of 15 grams each (15/170 × 100 = 8.82 grams original waste) were heated for 2 hours with 200 ml portions of each of the following solutions:

| | |
|---|---|
| 10% sucrose | 1% mannitol |
| 1% sucrose | 1% glycerol |
| 1% sorbitol | 1% propylene glycol |
| water | 1% ethylene glycol |

Mixtures were held at 90° to 100° C for 2 hours with frequent stirring. 10 millimeter aliquots of the supernatant solutions were then withdrawn for calcium analysis. Significant oxalate precipitates were obtained only with extracts using 10 percent sucrose, 1 percent sucrose, and 1 percent sorbitol which showed the following:

| | Calcium Extracted mg/100 ml | Percent of Original Ca |
|---|---|---|
| 10% sucrose | 49.6 | 4.3 |
| 1% sucrose | 14.2 | 1.2 |
| 1% sorbitol | 13.2 | 1.2 |

The extracted shell was combined from all extractions and ground in a Waring blender to about 40 mesh. A 15 gram aliquot was then re-extracted with 200 ml of 10 percent sucrose solution for 30 minutes at 90° to 100° C. Calcium in the extract solution was 129.5 mg/100 ml or 11.3 percent of that originally contained.

For comparison, 100 ml of 10 percent sucrose solution was treated with 5 grams of calcium oxide for 30 minutes at 90° to 100° C. Calcium in the filtered liquor was found to be 868 mg/100 ml. Calcium concentration in the sucrose solution from extraction of the ground shell was thus only 15 percent of the attainable value.

This example demonstrates that chitin can be converted to chitosan without prior demineralization of the shell and that substantial conversion of calcium carbonate to calcium hydroxide does occur even in the single stage treatment.

The importance of particle size on the rate of extraction of calcium hydroxide by solutions of polyhydric alcohols and the specific behaviour or certain polyhydric alcohols for calcium extraction is shown.

A. Seidell "Solubilities of Inorganic and Metal Organic Compounds" Fourth Edition, 1965, American Chemical Society, Washington, D.C., pp. 638–641, cites studies by several investigators on the solubility of calcium hydroxide in sucrose solutions. It is noted that solubilities depend on the condition of the calcium hydroxide, freshly precipitated hydroxide being more soluble. Also, solubilities are greater at lower temperatures than at higher temperatures.

Example 4 — Deacetylation and Decarbonation with Potassium Hydroxide

Solubilities in the system $KOH - K_2CO_3 - H_2O$ are reported in Seidel "Solubilities of Inorganic and Metal Organic Compounds" Fourth Edition, Vol. 2, pp. 82–83, and are presented along with similar data for the analogous sodium system. Carbonate solubilities are seen to be higher in the potassium system particularly at lower temperatures and lower hydroxide concentrations.

The equilibrium:

$$K_2CO_3 + Ca(OH)_2 \rightleftarrows CaCO_3 + 2KOH$$

was studied by M. I. Usanovich and S. A. Borovick, Chemical Abstracts, 24, page 5586 (1930) and is similar to that in the sodium system. The relative merits of sodium hydroxide and potassium hydroxide for deacetylation of chitin have not to our knowledge been investigated. Accordingly, an experiment similar to Examples 1 and 2 was conducted using potassium hydroxide instead of sodium hydroxide.

The apparatus of Example 1 was charged with 21.3 grams of 20 to 40 mesh deproteinized Dungeness crab shell. Potassium hydroxide solution 40 percent by weight was passed over the column of shell at 130° C with an average flow rate of about 2.3 milliliters per minute. Effluent was collected in 50ml increments over a two-hour period. Potassium carbonate did not crystallize from the effluent fractions on cooling as in the sodium system due to higher solubility. However, carbonate removal determined by titration in the effluents was rapid and nearly complete.

| Effluent Sample | Carbonate as $CaCO_3$* | Percent of Original $CaCO_3$ |
|---|---|---|
| 1 | 5.32 g | 38.5 |
| 2 | 5.32 g | 38.5 |
| 3 | 1.11 g | 8.0 |
| 4 | 0.90 | 6.5 |
| 5 | 0.55 g | 4.0 |
| Total | 13.20 g | 95.5 |

*Corrected for $CO_3^=$ in KOH

Following the carbonate extraction the shell column was washed with freshly boiled distilled water and then with 5 perecent sucrose solution at 95° C with an average flow rate of 6.2 ml per minute. This amounts to a residence time of 3.9 minutes. Calcium was determined in sucrose effluents with results as follows:

| Sucrose Effluent Number | Vol ml | Calcium Calculated as $CaCO_3$ (g) | Percent of Original $CaCo_3$ |
|---|---|---|---|
| 1 | 107 | 0.217 | 1.57 |
| 2 | 100 | 0.233 | 1.69 |
| 3 | 100 | 0.286 | 2.07 |
| 4 | 100 | 0.245 | 1.77 |
| 5 | 100 | 0.233 | 1.68 |
| 6 | 50 | 0.137 | 1.00 |
| Total |  | 1.351 | 9.78 |

Calcium removal by the sucrose solution amounted to less than 10 percent of that originally present. In view of the particle size, the contact time and results presented in Example 3, more complete extraction could not be expected for conditions used.

Following the sucrose extraction the residual shell was washed with water and removed from the column in three portions. top, middle and bottom. These were separately analyzed with results as follows:

| Portion | Dry Wt. | % Chitosan* | %Ca(OH)$_2$ | Total As Ca(OH)$_2$ + Chitosan | Total as $CaCO_3$ + Chitosan |
|---|---|---|---|---|---|
| Top | 3.49 | 38.2 | 48.2 | 86.4 | 113.3 |
| Middle | 3.30 | 34.2 | 54.6 | 88.8 | 116.9 |
| Bottom | 5.41 | 27.7 | 60.5 | 88.2 | 116.7 |

*(N × 8.7)

There was probably some recarbonation of calcium hydroxide during drying of the samples and deacetylation of chitin to chitosan would not have been complete under conditions of the potassium hydroxide treatment. However, if analyses are calculated as calcium carbonate plus chitin as in the original shell, total compositions of 113 to 117 percent are obtained. The more extensive calcium removal at the top of the column is clearly indicated.

Example 5 – Calcium Hydroxide Extraction from a Chitosan-Ca(OH)$_2$ – $CaCO_3$ Matrix Examples 2, 3, and 4 have shown that conversion of a calcium carbonate-chitin matrix to a chitosan-calcium hydroxide matrix can be readily accomplished by treatment with strong alkalis at elevated temperature (40 to 50 percent NaOH or KOH at 140° to 150° C). The extraction of calcium hydroxide from the matrix was however incomplete in these examples. The following examples demonstrate the use of various calcium extraction agents to accomplish more complete calcium removal.

In choosing a reagent for solubilization and extraction of calcium hydroxide, recovery of calcium from the extract solution and recycling of the extraction medium is desired. Reagents are therefore sought that will form soluble complexes with calcium hydroxide under mildly alkaline conditions but with stability constants permitting decomposition under neutral conditions such as by carbonation. It has been shown that certain polyhydric alcohols can be used for this purpose. Other substances which might serve are phenols, alkali thiocyanates, and nitrogeneous chelating agents such as nitro triacetic acid.

Experimental

Deproteinized shrimp shell was ground in a Waring blender to 20 to 60 mesh and analyzed with results as follows:

| Moisture | 5.0% |  |
| Chitin | 45.5% |  |
| $CaCO_3$ | 46.4% |  |
| Other Ash Components | 3.1% |  |
|  | 100.0 |  |

39.3 grams of the above material were placed in a neoprene-lined stainless steel autoclave with 300 ml of 50 wt. percent sodium hydroxide solution. The mixture was heated 2 hours in an autoclave at 150° C. The autoclave was then cooled and the solids were collected on a Buchner funnel and washed with distilled water. The moist cake was analyzed as follows:

| Solids | 36.4% | as received |
| Chitosan | 40.4 | dry basis |
| Calcium as Ca(OH)$_2$ | 38.4 | do. |
| Other Ash Components | 21.2 | do. |

Aliquot portions, 30 grams each, were extracted from the moist cake with 200 ml of 5 percent sucrose, 5 percent sucrose plus 3 percent sodium chloride and 5 percent phenol solutions. The mixtures were stirred intermittently for 30 minutes, samples for the liquors were withdrawn for analyses and extraction was continued for a total of 180 minutes. Results were as follows:

| Extractant solution | Grans Ca(OH)$_2$ at 30 min | per 200 ml at 180 min |
|---|---|---|
| 5% sucrose | 0.490 | 0.662 |
| 5% sucrose + 3% NaCl | 0.522 | 0.854 |
| 5% phenol | 0.794 | 0.856 |

Assuming 50 percent conversion of calcium carbonate to calcium hydroxide in the alkali treatment, the extent of calcium hydroxide extracted in 3 hours was 33, 40 and 86 percent respectively for the three extractant solutions.

Example 6 – Calcium Hydroxide Extraction from a Chitosan-Ca(OH)$_2$ — CaCO$_3$ Matrix Deproteinized shrimp shell as described in Example 5, was treated with 50 percent sodium hydroxide at 150° C for 2 hours. The residue was collected on a filter and washed with water. Analyses showed the following:

| | | |
|---|---|---|
| Solids | 26.4% | |
| Chitosan | 44.6% | dry basis |
| Calcium as Ca(OH)$_2$ | 41.7 | do. |
| Other Ash Components | 13.7 | do. |

15 gram aliquots of the moist solids were treated with 200 ml of each of the following extractant solutions: 5 percent sucrose, 5 percent potassium thiocyanate and 5 percent nitrilo tri-acetic acid tri-sodium salt (Na$_3$-N.T.A).

The mixtures were placed on a mechanical shaker and samples were withdrawn at 30, 60 and 90 minutes. Results are as follows for the calcium analysis:

| | Grams Ca(OH)$_2$ per 200 ml | | |
|---|---|---|---|
| Extractant | at 30 min | at 60 min | at 90 min |
| 5% sucrose | 0.995 | 1.04 | 1.10 |
| 5% KSCN | 0.400 | .342 | .382 |
| 5% Na$_3$NTA | 1.15 | 1.10 | .925 |

From analysis of the alkali treated shell the total calcium per 15 gram aliquot would be 1.65 grams as calcium hydroxide. Extraction of 1.10 grams thus represents 66.6 percent calcium removal and indicates at least corresponding conversion of calcium carbonate to calcium hydroxide in the single-stage treatment with 50 percent sodium hydroxide.

From Examples 5 and 6 sucrose, N.T.A. and phenol are found to be effective extractants for calcium hydroxide. Small particle size and agitation favor rapid extraction. In consideration of other factors such as cost, ease of recovery, biodegradability and toxicity, sucrose is the preferred material.

As above indicated, there are certain aspects of the invention that appear to be somewhat broader than the specific application to recovering chitosan and other by-products, wherein certain steps of the invention may be employed without the complete process. One of the more interesting of these is the use of the sucrose to produce a saccharate from a strong alkali treatment of a material containing alkaline earth carbonates such as the calcium carbonate described in connection with the shellfish waste, or barium and strontium, as other examples. By regenerating the sucrose in the manner described in connection with the system 27–34 of the flow sheet drawing, the alkaline earth carbonate will be precipitated from the extract and thus recovered from the material.

Further modifications will also occur to those skilled in this art and all such are considered to fall within the spirit and scope of the invention as defined in the appended claims.

What is claimed is:

1. A process for producing chitosan from deproteinized shell of crustacea species containing chitin and calcium carbonate, that consists essentially of, treating the deproteinized shell at a temperature between about 120° C and about 150° C with strong caustic alkali solution containing between about 30 and about 50 percent of alkali hydroxide by weight to produce at least partial deacetylation of the chitin and to convert calcium carbonate to calcium hydroxide, washing the extracted shell to remove excess strong caustic alkali solution containing as products of reaction alkali carbonate and alkali acetate, further extracting the deacetylated and decarbonated shell with a solution of a chelating agent selected from the group consisting of sucrose, glycols, EDTA, sorbitol and gluconates, thereby forming a soluble complex of calcium hydroxide from the deacetylated chitin, and separating out chitosan from the shell residue.

2. A process as claimed in claim 1 and in which the further step is performed of separating the said alkali carbonate.

3. A process as claimed in claim 1 and in which the further step is performed of separating the said alkali acetate.

4. A process as claimed in claim 1 and in which the said deproteinized shell is prepared from raw crustacea by treating the same with dilute alkali to produce a proteinate extract and acidulating to recover the protein therefrom.

5. A process as claimed in claim 1 and in which the said soluble complex of calcium is subjected to carbonation to precipitate said calcium carbonate.

6. A process as claimed in claim 1 and in which the said strong caustic alkali is selected from the group consisting of sodium and potassium hydroxides.

7. A process for recovering an alkaline earth carbonate from a crustacean shell raw material or the like containing the same, that consists essentially of, treating the material with strong alkali, dissolving the alkaline earth hydroxide thus formed with a solution of a chelating agent selected from the group consisting of sucrose, glycols, EDTA, sorbitol and gluconates, to form a soluble complex, and regenerating the same while precipitating the said alkaline earth carbonate.

* * * * *